US008095346B2

(12) United States Patent
Fukuda et al.

(10) Patent No.: US 8,095,346 B2
(45) Date of Patent: Jan. 10, 2012

(54) OPERATION SIMULATION SYSTEM FOR PLANT CONSTRUCTION

(75) Inventors: Yoshibumi Fukuda, Kasama (JP); Kenji Araki, Mito (JP); Hisanori Nonaka, Tokai (JP); Norito Watanabe, Hitachi (JP); Toshiyuki Miyake, Hitachi (JP); Kensuke Morita, Hitachi (JP); Kenji Akagi, Hitachi (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 326 days.

(21) Appl. No.: 12/353,373

(22) Filed: Jan. 14, 2009

(65) Prior Publication Data
US 2009/0192772 A1 Jul. 30, 2009

(30) Foreign Application Priority Data

Jan. 18, 2008 (JP) ................................ 2008-008622

(51) Int. Cl.
*G06G 7/48* (2006.01)
(52) U.S. Cl. .............................................. 703/6; 434/72
(58) Field of Classification Search .................. 703/1, 2, 703/6; 700/97, 105; 434/72
See application file for complete search history.

(56) References Cited

U.S. PATENT DOCUMENTS

| | | | | |
|---|---|---|---|---|
| 5,873,251 | A | * | 2/1999 | Iino .................................. 60/660 |
| 5,987,242 | A | * | 11/1999 | Bentley et al. ................... 703/13 |
| 6,063,128 | A | * | 5/2000 | Bentley et al. ..................... 703/6 |
| 7,139,685 | B2 | * | 11/2006 | Bascle et al. ........................ 703/1 |
| 7,584,165 | B2 | * | 9/2009 | Buchan ............................ 706/60 |
| 2008/0288307 | A1 | | 11/2008 | Kawabata et al. |
| 2009/0187384 | A1 | * | 7/2009 | Nonaka et al. ..................... 703/1 |

FOREIGN PATENT DOCUMENTS

| | | |
|---|---|---|
| JP | 04-026878 | 1/1992 |
| JP | 07-093408 | 4/1995 |
| JP | 07-244686 | 9/1995 |
| JP | 09-268760 | 10/1997 |
| JP | 10-280685 | 10/1998 |
| JP | 2004-151984 | 5/2004 |
| JP | 2005-182550 | 7/2005 |
| JP | 2007-148650 | 6/2007 |
| JP | 2007-164771 | 6/2007 |

OTHER PUBLICATIONS

Soltani et al., A.R. A Fuzzy Based Multi-Objective Path Planning of Construction Sites, Sciencedirect, Automation in Construction, Apr. 9, 2004, pp. 717-734.*
Zayed et al., T.M. Simulation as a Tool for Resource Management, IEEE, Simulation Conference Proceedings, 2000, pp. 1897-1906.*

* cited by examiner

*Primary Examiner* — Russell Frejd
(74) *Attorney, Agent, or Firm* — Antonelli, Terry, Stout & Kraus, LLP.

(57) ABSTRACT

An operation simulation system for plant construction, having operating expense calculated based on crane type determined by a command input; the expense to construct foundation calculated based on the foundation placement on which the determined crane is put; the operating expense calculated based on a period during which an operation is carried out; the expense to temporarily place the installation object calculated based on the specifications of the installation object before the installation; the installation operation expense calculated based on an installation milestone reflecting a due date of the installation object; the total necessary expense calculated based on all the expenses calculated; the total necessary expense is analyzed and evaluated; and the command input is adjusted by reflecting the results of an evaluation analysis so that the value of the command input falls in range of the set values in the specifications held by the corresponding setting apparatus.

5 Claims, 7 Drawing Sheets

FIG. 10

OPERATION SIMULATION SYSTEM FOR PLANT CONSTRUCTION

CLAIM OF PRIORITY

The present application claims priority from Japanese Patent application serial no. 2008-008622, filed on Jan. 18, 2008, the content of which is hereby incorporated by reference into this application.

BACKGROUND OF THE INVENTION

The present invention relates to an operation simulation system for plant construction in order to increase the efficiency of plant construction planning.

As the demand for electric power has increased in recent years, there has been an increasing desire for nuclear power plant construction on a worldwide scale. Accordingly, constructions of nuclear power plant have been carried out at home and abroad with an increasing number of constructions. In the construction of a plant such as an electric power plant, many types of operations including ground grading at a predetermined site, construction of building, carrying-in and installation of equipments, and installation of piping are executed alongside each other. These operations are carried out under directions of different organizations such as construction, civil engineering and manufacture, with their consent.

It is assumed that three stages, which are broadly classified, are carried out before a construction operation is started. These are design, procurement and construction. During the design stage, tasks are performed according to studies made by the organizations, which include plant building design, its internal design, layout of equipments installed in the building, carrying-in procedures, scheduling, setting of the temporary placement sites used before carrying-in, setting of the types of heavy machinery to be carried in, and setting of the operating ranges of the heavy machinery. During the procurement stage, materials and equipments required at the design stage are prepared so that they are carried in at the construction site according to the determined schedule. During the construction stage, which is the final stage, operations are performed using heavy machinery, based on the carrying-in procedures determined during the design stage. The heavy machinery is operated in the operating ranges determined during the design stage so that interference with the operations of other organizations does not occur. As described above, results obtained through the studies during the design stage are thought to affect the operations during the procurement and construction stages. To reduce backtracking at each stage and smoothly perform the entire operation, it is important to prepare an operation plan as efficient and precise as possible during the design stage. To prepare these types of efficient and precise plans during the design stage, in general, skilled persons have often taken responsibility. Since, however, the number of designs has been increased due to a recent increase in demands for plant construction; even non-skilled persons have been required to have the ability to prepare efficient operation plans.

When creating a plant construction plan for a nuclear power plant or the like during the design stage, a planner adjusts a plurality of conditions such as the procedures for bringing equipments into a building and the types of heavy machinery used at the time of carrying-in. These adjustments enable the creation of a plan that is the most suitable for increasing the overall efficiency.

Japanese Patent Laid-open No. 2007-164771 as a first prior art discloses a method for supporting a layout design. In the method, when a plan is created, a layout of the equipments and pipes is converted to a two-dimensional CAD drawing or three-dimensional CAD model according to the request of a planner. This conversion enables the planner to easily grasp the concrete positional relationship among the equipments and pipes on the created layout. The planner can also change coordinates of the equipments and pipes included in the layout by entering values in displayed dialog boxes. Furthermore, the planner can perform a layout with costs taken into consideration by calculating the costs of the pipes that are cost to actually perform construction operations based on the set layout.

Japanese Patent Laid-open No. Hei 09 (1997)-268760 as second prior art discloses a system for supporting management of a process plan. In the system, a plan to use cranes and other heavy machinery during construction operations is set for operations. The planner can select the types of heavy machinery. Furthermore, the system has a function for entering an operation plan into which the use of the selected heavy machinery is incorporated. The entered operation plan can be displayed, together with another process, in a window on a process cycle editing screen, which has the same time axis. Similarly, when the planner enters kind of occupation and the number of persons needed for the operation separately, a display can be reflected in a window on the process cycle editing screen.

SUMMARY OF THE INVENTION

In the system disclosed in Japanese Patent Laid-open No. 2007-164771, the costs required to install piping based on the set layout can be calculated. In addition to the cost of pipes themselves, however, the construction operation includes the costs to transport the equipments to be carried in and the costs to reserve a temporary placement area where the prepared pipes are stored until an operation starts. In view of these factors, when the entire efficiency of the construction operation is increased by reducing total costs, it cannot be necessarily said that minimizing only the costs required for piping is an optimum solution. That is, if the costs of pipes are reduced and thereby the layout becomes complex, when detailed operations are required during construction, operation costs may be raised, increasing the total cost.

The system disclosed in Japanese Patent Laid-open No. Hei 09 (1997)-268760 has a function for enabling the planner to enter an operation plan for a crane and other heavy machinery as well as the number of operators required for the operation, and for displaying the entered information. However, the system has no function for establishing a linkage between the inputs through which a change in one input is reflected in the other input. For example, when the operation plan for the heavy machinery is changed and thereby the number of heavy machines to be used is increased, a new plan can be displayed in a window. Although, in practice, the number of operators for the heavy machinery is also required to be increased, a change in the number of operators is not automatically reflected in the display in the window. The planner needs to explicitly enter the change of the number of the operators.

An object of the present invention is to provide an operation simulation system for plant construction that can increase efficiency of the entire plant construction.

The most essential feature of the present invention for attaining the above object is to reflect the results of an evaluation analysis carried out for a command input entered by a user and adjust the command input so that the value of the command input falls within ranges set in mutually related setting apparatus, so as to increase the entire efficiency of the construction operation.

A feature of the present invention is an operation simulation system for plant construction comprising: an input apparatus for giving a command input; a heavy machinery setting apparatus for determining a type of a crane used in a construction operation based on the command input; an operation index calculation apparatus for calculating operating expenses in the operation based on the determined crane type; a foundation placement setting apparatus for determining placement of a foundation, which defines an operating range of the determined crane; a foundation construction index calculation apparatus for calculating the expenses cost to construct a foundation based on the foundation placement; an operation period setting apparatus for determining a period during which an operation is carried out based on the command input; an operation period index calculation apparatus for calculating the operating expenses based on the determined period; an installation object setting apparatus for determining specifications of the installation object based on the command input; a temporary placement index calculation apparatus for calculating, based on the determined specifications of the installation object, the expenses cost to occupy an area in which to temporarily place the installation object before the installation object is installed; an installation milestone setting apparatus for determining a due date of the installation object based on the command input; an installation operation index calculation apparatus for calculating the installation operation expenses based on a received installation milestone; a total index calculation apparatus for calculating the total necessary expenses based on indexes calculated by the operation index calculation apparatus, foundation construction index calculation apparatus, operation period index calculation apparatus, a temporary placement index calculation apparatus and installation operation index calculation apparatus; an evaluation analysis apparatus for analyzing and evaluating calculated results; and an adjustment support apparatus for adjusting the command input by reflecting the results of an evaluation analysis obtained in the evaluation analysis apparatus so that the value of the command input falls within ranges set in mutually related setting apparatus.

Another feature of the present invention is an operation simulation system for plant construction comprising an operation index calculation apparatus for calculating a first operation leveling degree, which indicates a change in the amount of operation, based on a received crane type; a foundation construction index calculation apparatus for calculating a second operation leveling degree for a foundation construction operation based on a received foundation placement; an operation period index calculation apparatus for calculating a third operation leveling degree during an operation period based on a received operation period; a temporary placement index calculation apparatus for calculating, based on entered specifications of a installation object to be installed, a fourth operation leveling degree for an operation to temporarily place the installation object before the installation object is installed; an installation operation index calculation apparatus for calculating a fifth operation leveling degree for an installation operation based on a received installation milestone; and a total index calculation apparatus for calculating a total operation leveling degree based on indexes calculated by the operation index calculation apparatus, foundation construction index calculation apparatus, operation period index calculation apparatus, temporary placement index calculation apparatus and installation operation index calculation apparatus.

Another feature of the present invention is an operation simulation system for plant construction comprising an operation index calculation apparatus for calculating a first foundation area, which is required for an operation, based on a received crane type; a foundation construction index calculation apparatus for calculating a second foundation area based on a received foundation placement; an operation period index calculation apparatus for calculating, based on a received operation period, a third foundation area required during the operation period; a temporary placement index calculation apparatus for calculating, based on entered specifications of a installation object to be installed, a fourth foundation area required by heavy machinery to temporarily place the installation object before the installation object is installed; an installation operation index calculation apparatus for calculating a fifth foundation area required for an installation operation based on a received installation milestone; and a total index calculation apparatus for calculating a total necessary foundation area based on indexes calculated by the operation index calculation apparatus, foundation construction index calculation apparatus, operation period index calculation apparatus, temporary placement index calculation apparatus and installation operation index calculation apparatus.

Another feature of the present invention is an operation simulation system for plant construction comprising an operation index calculation apparatus for calculating, based on a received crane type, the number of usable operation modes that are enabled in an operation; a foundation construction index calculation apparatus for calculating the number of constructable foundation layouts based on a received foundation placement; an operation period index calculation apparatus for calculating the number of applicable operation plans based on a received operation period; a temporary placement index calculation apparatus for calculating, based on entered specifications of a device to be installed, the number of combinations of areas, in which to temporarily place the device before the device is installed; an installation operation index calculation apparatus for calculating the number of applicable operation plans based on a received installation milestone; and a total index calculation apparatus for calculating a total number of operation plans under conditions capable of being handled based on indexes calculated by the operation index calculation apparatus, foundation construction index calculation apparatus, operation period index calculation apparatus, temporary placement index calculation apparatus, and installation operation index calculation apparatus.

Another feature of the present invention is an operation simulation system for plant construction comprising an operation index calculation apparatus for calculating a first period required for an operation based on a received crane type; a foundation construction index calculation apparatus for calculating a second period required to construct a foundation based on a received foundation placement; an operation period index calculation apparatus for individually calculating a third period required to execute an operation process based on a received operation period; a temporary placement index calculation apparatus for calculating, based on entered specifications of a installation object to be installed, a fifth period required to execute an operation to temporarily place the installation object before the installation object is installed; an installation operation index calculation apparatus for calculating an operation period required for the installation milestone based on a received installation milestone; and a total index calculation apparatus for calculating a total operation period based on indexes calculated by the operation index calculation apparatus, foundation construction index calculation apparatus, operation period index calculation apparatus, temporary placement index calculation apparatus, and installation operation index calculation apparatus.

According to the present invention, since a command input is adjusted by reflecting the results of an evaluation analysis carried out for a command input entered by the user so that the value of the command input falls within ranges set in mutually related setting apparatus, error in the evaluation analysis results due to an input mistake by the user from spreading can be decreased.

The present invention can obtain another advantage that since evaluation analysis results related to the entire plant construction are obtained from a plurality of apparatus, each of which calculates an index related to plant construction, and a apparatus for totaling the indexes from the plurality of apparatus, not only local improvement but also increased efficiency of the entire plant construction are achieved.

DETAILED DESCRIPTION OF THE PREFERRED EMBODIMENTS

Embodiments of the present invention will be described below.

The operation simulation system for plant construction in the present invention includes an adjustment support apparatus so that a command input can be adjusted, thereby achieving an objective of adjusting the command input so that its value falls within ranges set in mutually related setting apparatus and another objective of producing evaluation analysis results related to the entire plant construction.

First Embodiment

Figure 1:
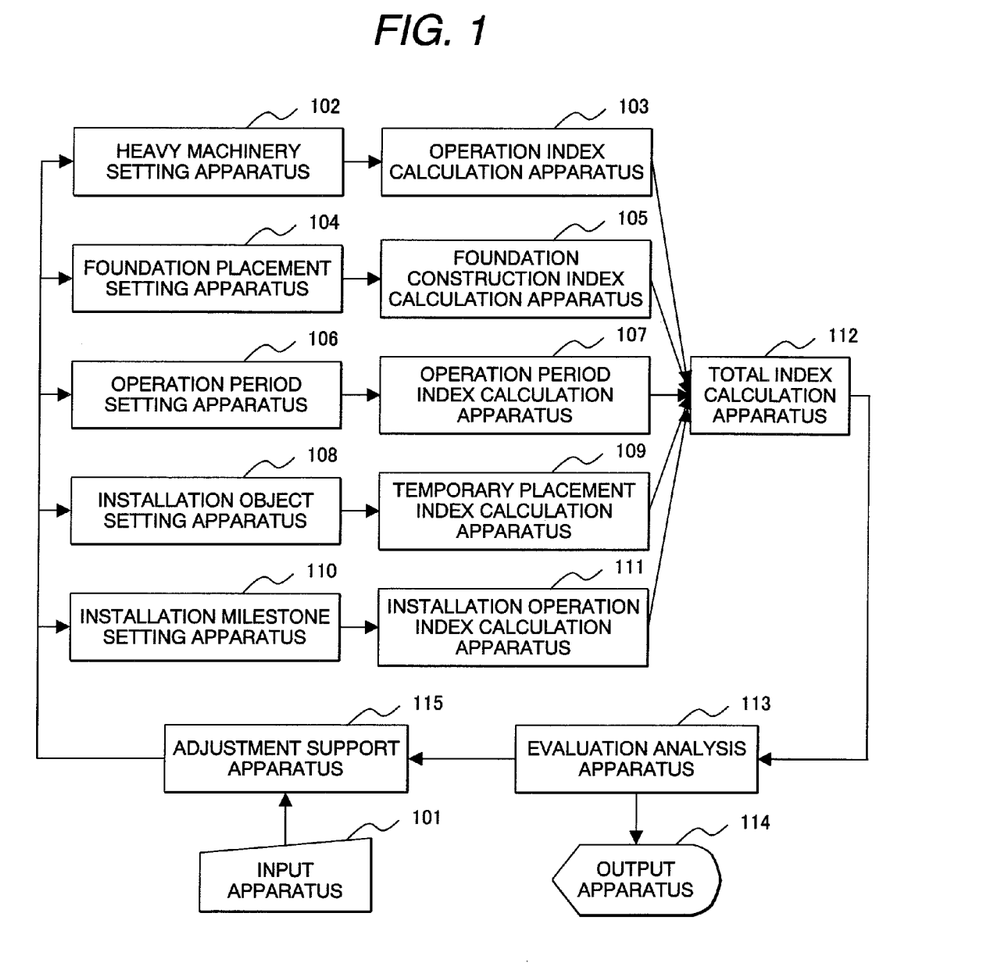
FIG. 1 is a structural diagram showing an operation simulation system for plant construction according to a first embodiment which is a preferred embodiment of the present invention.

FIG. 1 is a structural diagram showing an operation simulation system for plant construction according to a first embodiment which is a preferred embodiment of the present invention.

The operation simulation system for plant construction of this embodiment has an input apparatus 101, a heavy machinery setting apparatus 102, an operation index calculation apparatus 103, a foundation placement setting apparatus 104, a foundation construction index calculation apparatus 105, an operation period setting apparatus 106, an operation period index calculation apparatus 107, an installation object setting apparatus 108, a temporary placement index calculation apparatus 109, an installation milestone setting apparatus 110, an installation operation index calculation apparatus 111, a total index calculation apparatus 112, an evaluation analysis apparatus 113, an output apparatus 114 and an adjustment support apparatus 115.

The input apparatus 101 has a keyboard, a mouse and other input devices. The input apparatus 101 receives an input from the user through these input devices and sends a command input to the adjustment support apparatus 115. The adjustment support apparatus 115 first sends the entered command input to the heavy machinery setting apparatus 102, the foundation placement setting apparatus 104, the operation period setting apparatus 106, the installation object setting apparatus 108 and the installation milestone setting apparatus 110. The heavy machinery setting apparatus 102 determines the type of crane used in a construction operation based on the command input. The heavy machinery setting apparatus 102 also holds a shape, a weight, a lifting capacity, an operating range, and other specifications for each crane type, and sends them according to a request to the operation index calculation apparatus 103 together the determined type of crane. The operation index calculation apparatus 103 calculates operating expenses of the crane cost when a crane of the type set is used for an operation, based on the determined type of crane from the heavy machinery setting apparatus 102. The foundation placement setting apparatus 104 determines the placement of the operating range of the crane, the operating range being referred to as the foundation, based on the command input. The foundation placement setting apparatus 104 also holds foundation construction expenses, foundation construction periods, and other specifications based on foundation shapes, and sends them according to a request to the foundation construction index calculation apparatus 105 together the determined foundation placement. The foundation construction index calculation apparatus 105 calculates the expenses cost to construct the foundation, which includes ground grading and paving, based on the determined foundation placement from the foundation placement setting apparatus 104. The operation period setting apparatus 106 determines a period during which an operation is carried out, based on the command input. The operation period setting apparatus 106 also holds units for the number of operators, operating expense units and other specifications, and sends them according to a request to the operation period index calculation apparatus 107 together this determined operation period. The operation period index calculation apparatus 107 calculates the crane operator expense required for the determined operation period based on the determined operation period from the operation period setting apparatus 106. The installation object setting apparatus 108 determines the type of equipment (installation object) such as a heat exchanger or containment vessel to be installed, based on the command input. The installation object setting apparatus 108 also holds a shape, a weight, a temporary placement area and other specifications for each equipment type, and sends them according to a request to the temporary placement index calculation apparatus 109 together this determined type of equipment. The temporary placement index calculation apparatus 109 calculates, based on the determined type of equipment from the installation object setting apparatus 108, the expenses cost when an area in which to temporarily install the equipment before an operation is executed is occupied, the area being near a building in which the equipment is finally installed. The installation milestone setting apparatus 110 determines a due date by which the equipment used in the operation must be installed, based on the command input. The installation milestone setting apparatus 110 also holds constraint conditions before and after the installation due date, constraint conditions about installation intervals and other specifications, and sends them according to a request to the installation operation index calculation apparatus 111 together this determined installation due date. The installation operation index calculation apparatus 111 calculates the expenses cost for an installation operation for a due date based on the determined installation due date from the installation milestone setting apparatus 110. The total index calculation apparatus 112 calculates the total expenses required for the entire construction operation based on the calculated expenses from the operation index calculation apparatus 103, foundation construction index calculation apparatus 105, operation period index calculation apparatus 107, temporary placement index calculation apparatus 109 and installation operation index calculation apparatus 111. The evaluation analysis apparatus 113 analyzes the total expenses calculated by the total index calculation apparatus 112 and generates evaluation information including processes and equipment layouts according to which the user makes a decision during the planning of plant construction and also including expenses required to achieve them. The output apparatus 114 includes a display apparatus, a printer, an auxiliary storage apparatus, and other output devices. The output apparatus 114 inputs the evaluation information from the evaluation analysis apparatus 113 and outputs it so that the user can access it. The adjustment support apparatus 115 receives the command input entered by the user from the input apparatus 101 and sends it to the heavy machinery setting apparatus 102, foundation placement setting apparatus 104, operation period setting apparatus 106, installation object setting apparatus 108 and installation milestone setting apparatus 110. In this case, the adjustment support apparatus 115 detects command inputs that mutually relate among these setting apparatus based on the evaluation information generated by the evaluation analysis apparatus 113. When a command input has been sent to one setting apparatus, the adjustment support apparatus 115 adjusts the value of another command input to be sent to another setting apparatus so that the value of the other command input falls within a set input range set by the evaluation information before sending the other command input to the other setting apparatus.

Next, an example using the operation simulation system of this embodiment to change a foundation placement setting so as to match a crane type setting will be described with reference to FIGS. 2 through 4.

When the operation simulation system for plant construction of this embodiment starts to operate, it first executes processing in step 201. FIG. 3 shows an example of an image displayed on a display apparatus of the output apparatus 114 in this step. The display apparatus displays a finish button 301, a first section 302 for inputting a set value of a crane type, a second section 303 for inputting a set value of a foundation placement, a third section 304 for inputting a set value of an operation period, a fourth section 305 for inputting a set value of an installation object, a fifth section 306 for inputting a set value of an installation milestone, and an Execute button 307. In step 201, input information of the user is entered from the input apparatus 101, and then processing of step 2 is executed. In the step 202, it is determined whether or not the input information entered by the user is a request to finish the entire processing of the operation simulation system for plant construction of this embodiment. When the request is to finish the entire processing, it is finished. If not, processing of step 203 is executed. A request to finish the entire processing is issued when the finish button 301 is clicked. Other requests are issued when the Execute button 307 is clicked. In step 203, a command input indicating a command for the system is obtained from the input information of the user, which has been entered in the step 201, and then processing proceeds to step 204. A value entered in at least one of the first section 302, second section 303, third section 304, fourth section 305, and fifth section 306 is used as the command input. In step 204, it is determined whether evaluation information has been input from the evaluation analysis apparatus 113 to the adjustment support apparatus 115. When the evaluation information has been input, processing of step 205 is executed. If not, processing of step 206 is executed. In step 205, the user's command input is adjusted based on the evaluation information generated by the evaluation analysis apparatus 113, and then processing of step 206 is executed. In the step 206, the command input is sent to the appropriate setting apparatus, that is, to at least one of the heavy machinery setting apparatus 102, foundation placement setting apparatus 104, operation period setting apparatus 106, installation object setting apparatus 108, and installation milestone setting apparatus 110, and then processing of step 207 is executed. In the step 207, the set value obtained based on the command inputs sent to each the setting apparatus is sent to the appropriate index calculation apparatus, that is, to at least one of the operation index calculation apparatus 103, foundation construction index calculation apparatus 105, operation period index calculation apparatus 107, temporary placement index calculation apparatus 109, and installation operation index calculation apparatus 111, and then processing of step 208 is executed. In the step 208, indexes calculated by using the entered set values are sent to the total index calculation apparatus 112. The index calculated by the operation index calculation apparatus 103 is the expenses required to operate the crane. The index calculated by the foundation creation index calculation apparatus 105 is the expenses required to construct the foundation. The index calculated by the operation period index calculation apparatus 107 is the crane operator expenses required for the operation period. The index calculated by the temporary placement index calculation apparatus 109 is the expenses required to occupy the area where the equipment are temporarily placed. The index calculated by the installation operation index calculation apparatus 111 is the expenses for an installation operation of each due date. Processing then of step 209 is executed. In the step 209, the total expenses required for the entire plant construction are calculated based on the expenses calculated by each the index calculation apparatus, and then processing of step 210 is executed. In the step 210, the total expenses calculated in the step 209 are analyzed, evaluation information including processes, equipment layouts and the expenses required to achieve them is generated, and the generated evaluation information is sent to the output apparatus 114 and adjustment support apparatus 115, and then processing of step 211 is executed. In the step 211, the evaluation information generated in the step 210 is sent to the output apparatus 114 and processing returns to the step 201.

Figure 4:
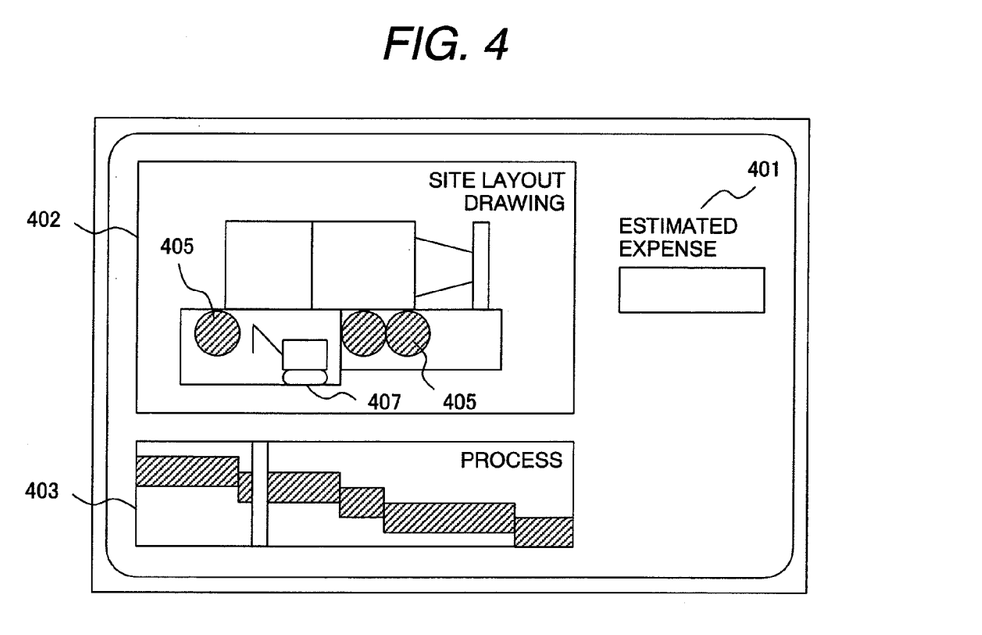
FIG. 4 is an explanatory drawing showing an example of an image displayed on a display apparatus of an output apparatus shown in FIG. 1, the display apparatus indicating the results of evaluation analysis in which plant construction expenses are used as an index.

FIG. 4 shows an example of an image displayed on a display apparatus of the output apparatus 114 in the above processing. In this example, the expenses required for the entire plant construction, which are included in the evaluation information generated in the step 210, are displayed in a sixth section 401 for outputting the estimated expenses, as an item named "Estimated expenses". In the site layout drawing 402, the crane type to be set in the heavy machinery setting apparatus 102, a foundation 405, indicating the crane operating range, to be set in the foundation placement setting apparatus 104, and a temporary equipment placement 407, to be set in the installation object setting apparatus 108, are displayed. In a process chart 403, the operation period to be set in the operation period setting apparatus 106 and the installation due date to be set in the installation milestone setting apparatus 110 are displayed.

Figure 5:
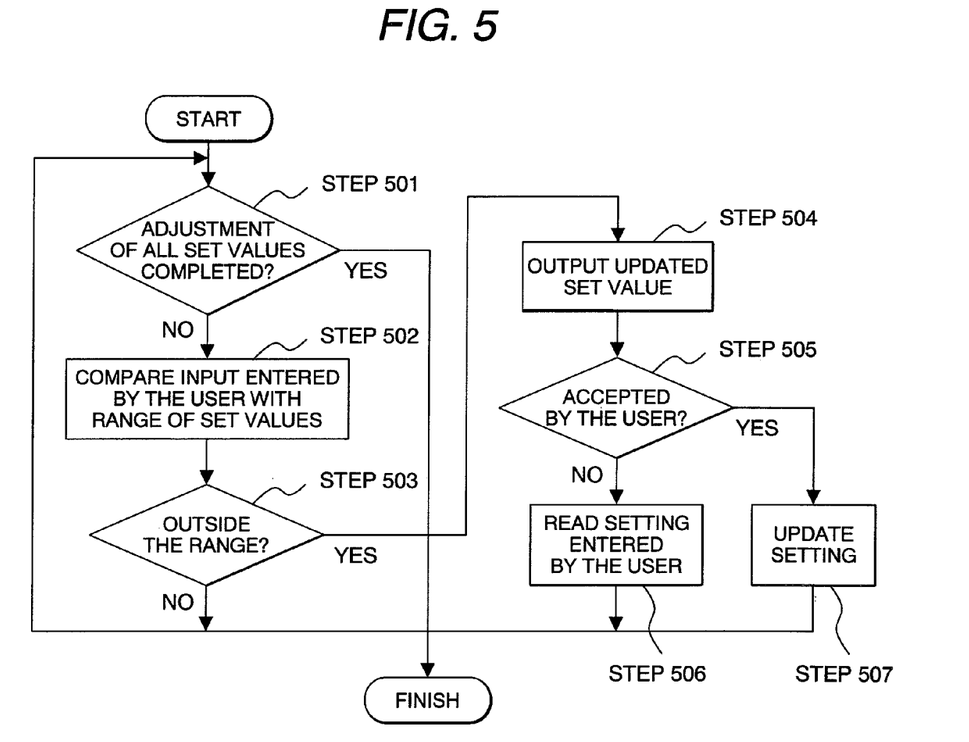
FIG. 5 is a flowchart showing a processing flow in an adjustment support apparatus shown in FIG. 1 for adjusting a command input entered by a user.

An example of processing executed in the adjustment support apparatus 115 of the operation simulation system for plant construction of this embodiment will be described with reference to FIGS. 5 and 6. FIG. 5 shows a flowchart for processing by the adjustment support apparatus 115. When a processing starts, whether all object set values have been adjusted is determined in step 501. When the adjustments have been completed, processing finishes. If not, processing of step 502 is executed. In the step 502, a single set value entered by the user is compared with the range of the set values in the specifications held by the corresponding setting apparatus, and then processing of step 503 is executed. In the step 503, whether the set value compared in the step 502 is outside the range is determined. When the set value is outside the range, processing of step 504 is executed. If not, processing returns to the step 501. In the step 504, the set value entered by the user is updated so that it falls within the range against which the set value has been compared in the step 502, and the updated set value is output to the output apparatus 114, and then processing of step 505 is executed. In the step 505, whether or not the user has accepted the updated set value, which has been output in the step 504, is determined. When the user has accepted the updated set value, processing of step 507 is executed. If not, processing of step 506 is executed. In the step 506, input of a new set value is required to the user, and processing returns to the step 501 so that adjustment is performed again based on the entered new set value. In step 507, the updated setting, which has been output in step 504, is used as a new setting, and processing returns to step 501 so that another setting is adjusted.

An example of updating a set value of a foundation placement in the adjustment of the set value according to the above processing flow will be described. In this example, items other than the command input entered by the user through the input apparatus 101 are adjusted in the adjustment support apparatus 115 based on evaluation information generated in the evaluation analysis apparatus 113. Specifically, when a set value of a crane type has been already set and evaluation information has been prepared, the set value of the foundation placement is adjusted. In this state, the evaluation information has been already generated in the steps 206 to 211 based on crane type "type 1, mode B" entered by the user in the first section 302 displayed on the display apparatus. Processing returns to the step 201 to enter the input of the user. In the step 201, the foundation area inputted in the second section 303 is entered. In step 202, it is determined whether the input entered by the user is a request to finish the entire processing of the operation simulation system for plant construction of this embodiment. Since finish of the entire processing is not required, processing of the step 203 is executed. In the step 203, the command input included in the input entered by the user is read. In this example, a set value of the foundation placement indicating the foundation area is entered. In the step 204, whether there is already the evaluation information is determined. Since there is the evaluation information, processing of the step 205 is executed. In the step 205, the adjustment of the set value is performed according to the processing shown in FIG. 5. First, whether all set values have been adjusted is determined in the step 501. Since, in this example, all set values have not been adjusted, processing of the step 502 is executed. In the step 502, "700", which is a new set value of the foundation area entered by the user in the second section 303 (see in FIG. 6) displayed on the display apparatus, is compared with "900 or more" which is the operating range for crane type "type 1, mode B" entered by the user, on the basis of the specifications held in the heavy machinery setting apparatus 102. Whether the new set value is outside the range is then determined in the step 503. Since, in this example, the new set value is outside the range, processing of the step 504 is executed. In the step 504, the set value is updated and the updated set value is displayed on the display apparatus of the output apparatus 114.

Figure 6:
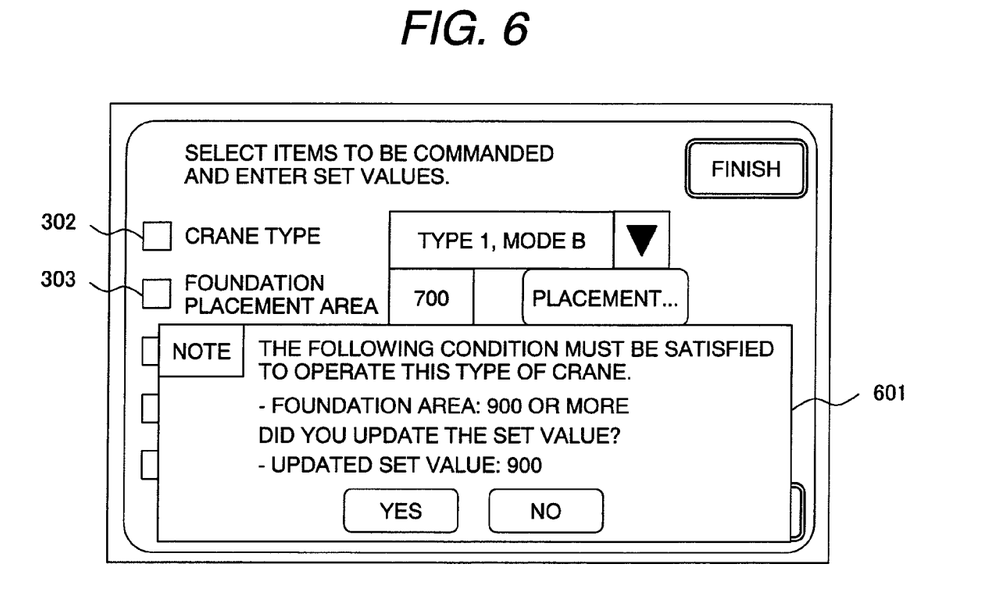
FIG. 6 is an explanatory drawing showing an example of an image displayed on a display apparatus of an output apparatus during the execution of the flowchart shown in FIG. 5.

FIG. 6 shows an exemplary display. The displayed image is similar to FIG. 3, but an update confirmation dialog box 601 is added. The update confirmation dialog box 601 displays a message indicating that the set value entered by the user is outside the range of the set value (900 or more) in the specifications held by the heavy machinery setting apparatus 102, together with the updated set value. With this display given, whether the user has accepted the updated set value is determined in the step 505. The user clicks the Yes button to accept the updated set value or the No button to reject the updated set value. In this example, processing is continued under the assumption that the Yes button has been clicked. When the Yes button is clicked, processing proceeds to the step 507 to process the determination result. In the step 507, the updated set value is used as a new set value, and processing returns to the step 501 so that another set value is adjusted. Consequently, the foundation area is set to 900, which is large enough for the type 1, mode B crane to operate. As described above, the user can adjust the foundation area without having to explicitly adjust and enter a new set value.

Second Embodiment

In an operation simulation system for plant construction according to a second embodiment which is another embodiment of the present invention, an example of using an operation leveling degree as the index will be described with reference to FIG. 7. The operation leveling degree means a change in the number of operators during a stage in the plant construction process. When the number of operators frequently increases and decreases at each stage of the process, the operation leveling degree is reduced. When the number of operators does not increase and decrease so much in each stage of the process, the operation leveling degree becomes high. When the operation leveling degree in the process is high, a fixed amount of operation can be continuously assigned to each operator, increasing the operation efficiency of each operator. As a result, the installation period and operation costs can be reduced.

A structure of an operation simulation system for plant construction of this embodiment that uses the operation leveling degree as the index is equivalent to the operation simulation system for plant construction shown in FIG. 1. The index calculated in each calculation apparatus is related to the operation leveling degree instead of the expense. The operation index calculation apparatus 103 calculates the operation leveling degree based on the crane type set by the heavy machinery setting apparatus 102. When, for example, the number of cranes is set to 2, either or both of the two cranes can be operated and thereby the period during which the operation is stopped can be reduced, increasing the operation leveling degree. The foundation construction index calculation apparatus 105 calculates the operation leveling degree based on the foundation placement set by the foundation placement setting apparatus 104. When, for example, the foundation area is set to a large value, a margin is provided in the operating range of the crane or the like and thereby the time spent performing preliminary operations such as K-turns needed between essential operations can be reduced, increasing the operation leveling degree. The operation period index calculation apparatus 107 calculates the operation leveling degree based on the operation period set by the operation period setting apparatus 106. When, for example, a long operation period is set, a margin is provided in the period required to complete the operation, increasing the operation leveling degree. The temporary placement index calculation apparatus 109 calculates the operation leveling degree based on the specifications for the installation object, which is set in the installation object setting apparatus 108. When, for example, a plurality of equipments is temporarily placed, if these equipments are spaced, situations to avoid interference during installation can be reduced. Accordingly, the time spent performing preliminary operations to avoid the interference is reduced, increasing the operation leveling degree. The installation operation index calculation apparatus 111 calculates the operation leveling degree based on the installation milestone set by the installation milestone setting apparatus 110. When, for example, the installation milestone interval is increased, a margin is provided in the period required to complete one milestone, increasing the operation leveling degree.

Figure 2:
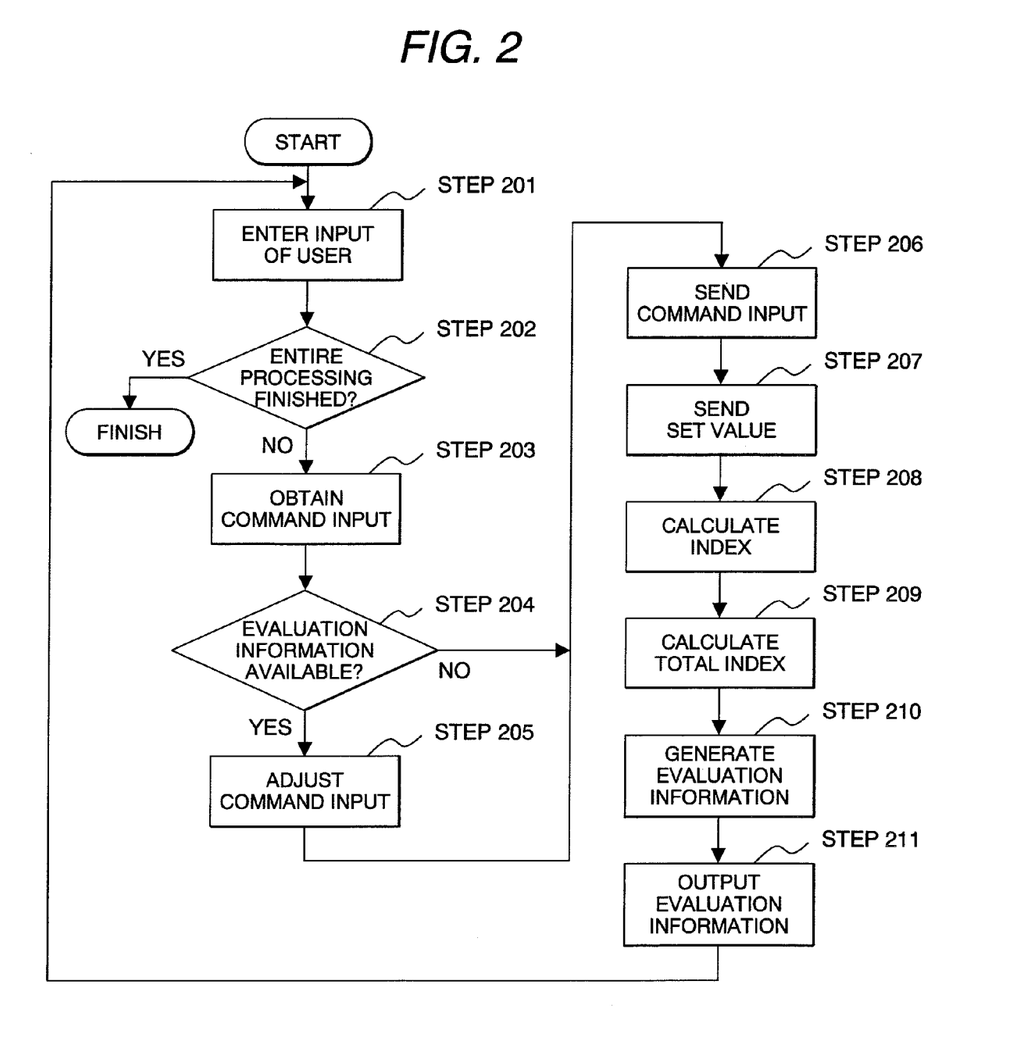
FIG. 2 is a flowchart showing a processing flow in the operation simulation system for plant construction shown in FIG. 1.
Figure 3:
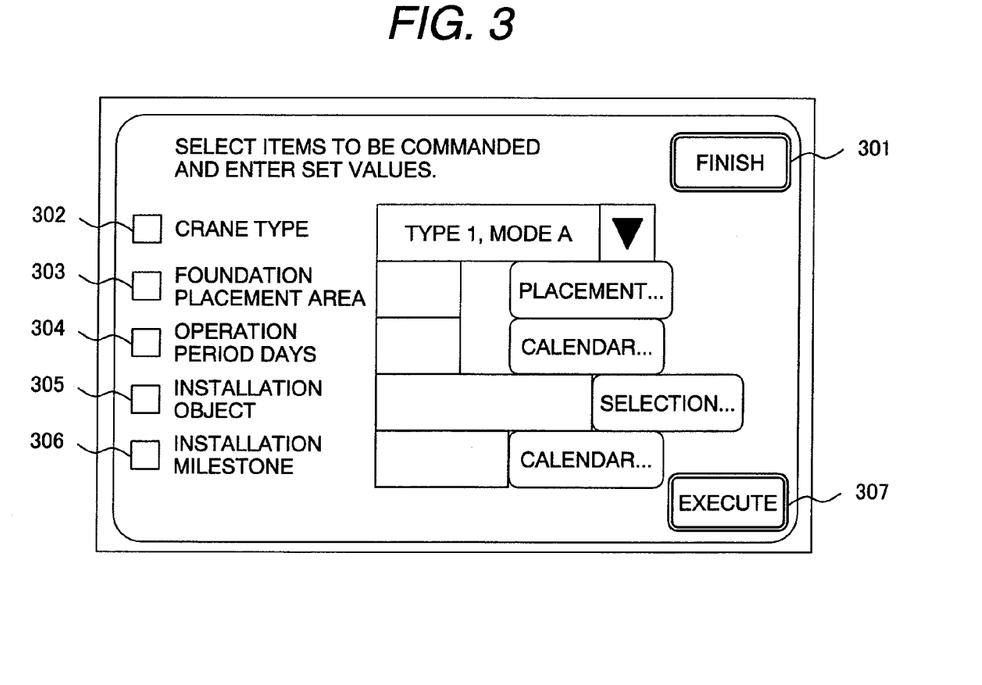
FIG. 3 is an explanatory drawing showing an example of an image displayed on a display apparatus of an output apparatus shown in FIG. 1, to which settings are entered.

The flow of processing in which the operation leveling degree is used as the index is equivalent to the flows shown in FIGS. 2 and 5. The set value compared, entered, or output in each step is related to the operation leveling degree. The user responsible for planning plant construction operations can use this flow of processing to generate a plan for optimizing the operation leveling degree.

Figure 7:
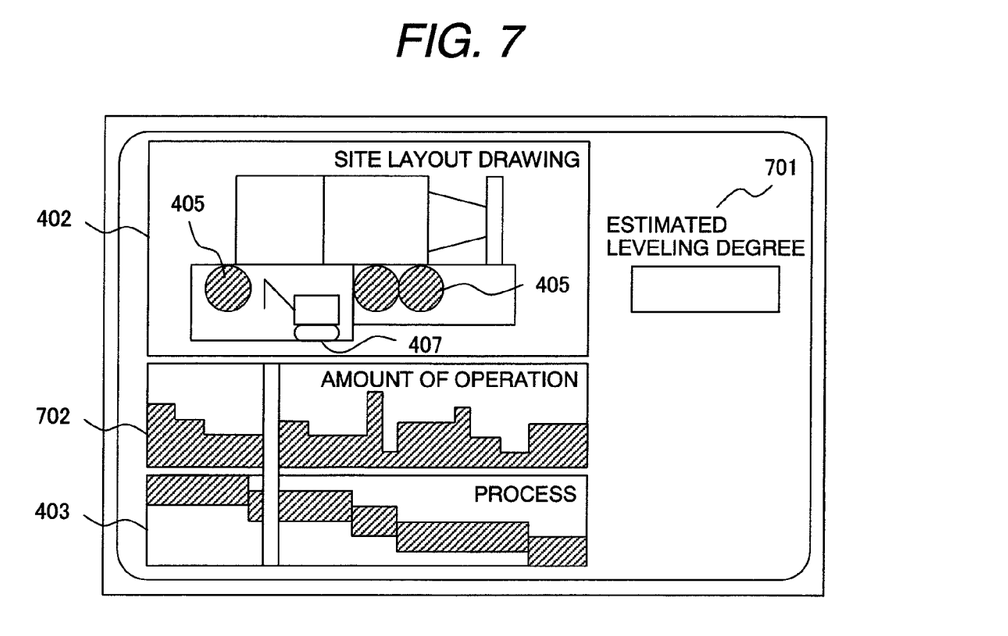
FIG. 7 is an explanatory drawing showing an example of an image displayed on a display apparatus of an output apparatus of an operation simulation system for plant construction according to a second embodiment which is another embodiment of the present invention when an operation leveling degree is used as the index.

FIG. 7 shows an exemplary output, in this embodiment, which is displayed on the display apparatus of the output apparatus 114. In addition to the site layout drawing 402 and process chart 403 as shown in FIG. 4, an estimated operation leveling degree, which is output by the system, is displayed in a section 701 for outputting the estimated operation leveling degree, and a operation amount chart 702 indicating changes in the amount of operation, which are obtained as a result of the processing, is also displayed.

Third Embodiment

In an operation simulation system for plant construction according to a third embodiment which is another embodiment of the present invention, an example of using a foundation area for an operation as the index will be described with reference to FIG. 8. The foundation area for an operation means an area having a range in which heavy machinery such as cranes operates. When an operation by a crane extends over a wide range, or a large crane is used, the foundation area is enlarged. When the operation area is narrowed, or a manual operation can be carried out with a small crane, the foundation area is narrowed. A crane used to install heavy equipment is heavy, so pavement in the operating range and other improvements must be carried out before an operation starts. If the foundation area is reduced, costs for the improvements can be reduced and interference with area in which to temporarily place equipment and area used by other business organization can be avoided. Consequently, the construction period and operation costs, for example, can be reduced.

A structure of an operation simulation system for plant construction of this embodiment that uses the foundation area as the index is equivalent to the operation simulation system for plant construction shown in FIG. 1. The index calculated in each calculation apparatus is related to the foundation area. The operation index calculation apparatus 103 calculates the necessary foundation area based on the crane type set by the heavy machinery setting apparatus 102. When, for example, a small crane is set, the area needed for the crane to move can be reduced, reducing the necessary foundation area. The foundation construction index calculation apparatus 105 calculates the necessary foundation area based on the foundation placement set by the foundation placement setting apparatus 104. When, for example, the foundation placement is concentrated into a single place, common areas may be increased, when compared with a case in which the foundation placement is dispersed, reducing the necessary foundation area. The operation period index calculation apparatus 107 calculates the necessary foundation area based on the operation period set by the operation period setting apparatus 106. When, for example, a long operation period is set, a margin is provided in the period required to complete the operation. Accordingly, the necessity to temporarily place a lot of equipments at the same time before they are installed is lessened, reducing the necessary foundation area. The temporary placement index calculation apparatus 109 calculates the necessary foundation area based on the specifications for the installation object, which is set in the installation object setting apparatus 108. When, for example, a plurality of equipments is temporarily placed, if these equipments are spaced, situations to avoid interference during installation can be reduced. Accordingly, the time spent performing preliminary operations to avoid the interference is reduced, reducing the necessary foundation area. The installation operation index calculation apparatus 111 calculates the necessary foundation area based on the installation milestone set by the installation milestone setting apparatus 110. When, for example, the installation milestone interval is increased, a margin is provided in the period required to complete one milestone. Accordingly, the necessity to temporarily place a lot of equipments at the same time before they are installed is lessened, reducing the necessary foundation area.

The flow of processing in which the foundation area is used as the index is equivalent to the flows shown in FIGS. 2 and 5.

The set value compared, entered, or output in each step is related to the foundation area. The user responsible for planning plant construction operations can use this flow for processing to generate a plan for optimizing the necessary foundation area in each operation.

Figure 8:
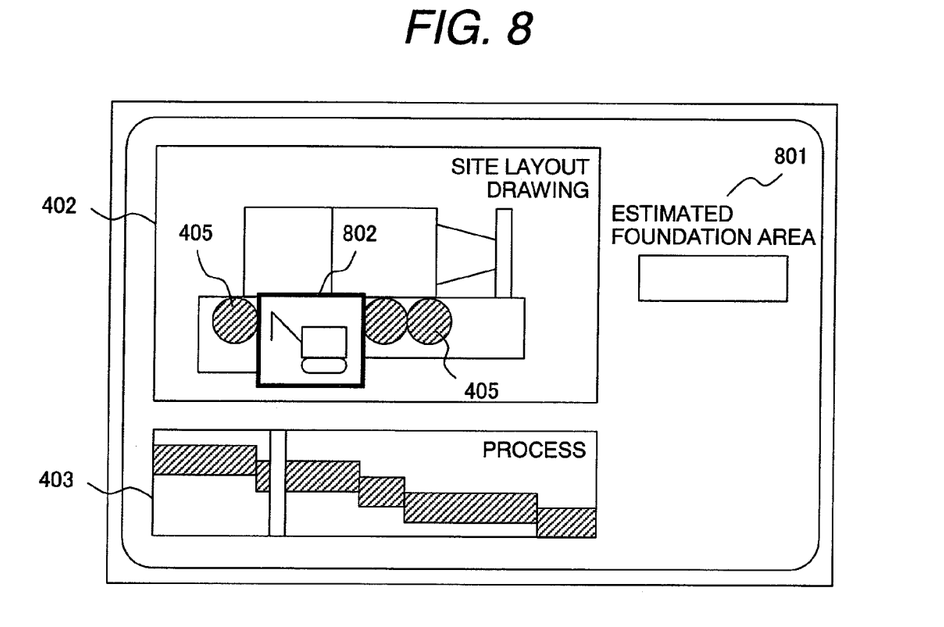
FIG. 8 is an explanatory drawing showing an example of an image displayed on a display apparatus of an output apparatus of an operation simulation system for plant construction according to a third embodiment which is another embodiment of the present invention when a foundation area for an operation is used as the index.

FIG. 8 shows an exemplary output, in this embodiment, which is displayed on the display apparatus of the output apparatus 114. In addition to the site layout drawing 402 and process chart 403 as shown in FIG. 4, an estimated foundation area, which is output by the system, is displayed in a section 801 for outputting the estimated foundation area. In the site layout drawing 402, a foundation placement 802 is enclosed by bold lines.

Fourth Embodiment

In an operation simulation system for plant construction according to a fourth embodiment which is another embodiment of the present invention, an example of using the number of modes usable to a operation as the index will be described with reference to FIG. 9. The number of modes usable to an operation means the number of operation plans selectable under the same condition. When the operation period is limited to a short period and thus a plurality of operation plans cannot be prepared or when the operating range of the heavy machinery is limited and thus there are only a few selectable operating paths, the number of usable modes is reduced. When the operation period is long enough and thus the user can select any one of a plurality of plans according to the progress of the operation or when the operating range of the heavy machinery is large enough and thus many operating paths are selectable, the number of usable modes is increased. An increased number of usable modes enable the user to select any one of the plurality of plans according to the progress of the operation and thereby to apply an efficient operation. Consequently, the construction period and operation costs, for example, can be reduced.

A structure of an operation simulation system for plant construction of this embodiment that uses the number of modes usable to an operation as the index is equivalent to the operation simulation system for plant construction shown in FIG. 1. The index calculated in each calculation apparatus is related to the number of modes usable to an operation. The operation index calculation apparatus 103 calculates the number of usable modes from the crane type set by the heavy machinery setting apparatus 102. When, for example, the number of cranes is set to 2, either or both of the two cranes can be operated and thereby a plurality of operation methods can be set, increasing the number of usable modes. The foundation construction index calculation apparatus 105 calculates the number of usable modes based on the foundation placement set by the foundation placement setting apparatus 104. When, for example, the foundation area is set to a large value, a margin is provided in the operating range of the crane or the like. Thus, the number of operating paths followed by the crane can be increased, increasing the number of usable modes. The operation period index calculation apparatus 107 calculates the number of usable modes based on the operation period set by the operation period setting apparatus 106. When, for example, the long operation period is set, a margin is provided in the period required to complete the operation and thereby a plurality of operation modes can be set, increasing the number of usable modes. The temporary placement index calculation apparatus 109 calculates the number of usable modes based on the specifications for the installation object which is set in the installation object setting apparatus 108. When, for example, a plurality of equipments is temporarily placed, if these equipments are spaced, a margin is provided in the operating range of the crane. Accordingly, the number of operating paths followed by the crane is increased, increasing the number of usable modes. The installation operation index calculation apparatus 111 calculates the number of usable modes based on the installation milestone set by the installation milestone setting apparatus 110. When, for example, the installation milestone interval is increased, a margin is provided in the period required to complete one milestone, increasing the number of usable modes, and thereby a plurality of operation methods can be set, increasing the number of usable modes.

The flow of processing in which the number of modes usable to an operation is used as the index is equivalent to the flows shown in FIGS. 2 and 5. The set value compared, entered, or output in each step is related to the number of usable modes. The user responsible for planning plant construction operations can use this flow of processing to generate a plan for optimizing the number of usable modes.

Figure 9:
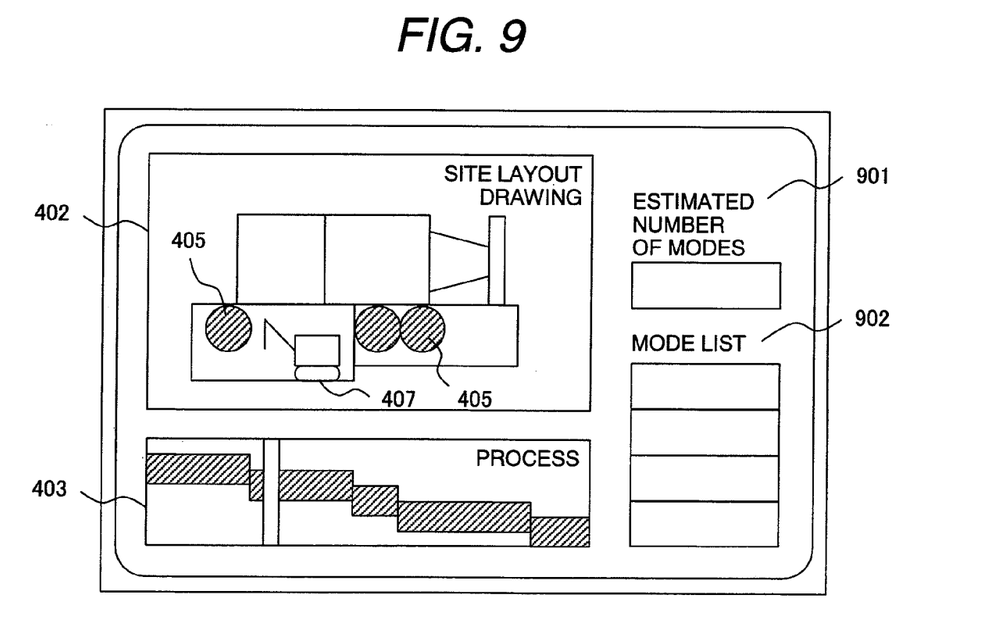
FIG. 9 is an explanatory drawing showing an example of an image displayed on a display apparatus of an output apparatus of an operation simulation system for plant construction according to a fourth embodiment which is another embodiment of the present invention when the number of modes usable by an operation is used as the index.

FIG. 9 shows an exemplary output, in this embodiment, which is displayed on the display apparatus of the output apparatus 114. In addition to the site layout drawing 402 and process chart 403 as shown in FIG. 4, an estimated number of modes, which is output by the system, is displayed in a section 901 for outputting the estimated number of modes, and a usable mode list 902 is also displayed, from which usable modes obtained as a result of the processing are selected one at a time and displayed on the display unit.

Fifth Embodiment

In an operation simulation system for plant construction according to a fifth embodiment which is another embodiment of the present invention, an example of using a period required for an operation as the index will be described with reference to FIG. 10. The period required for an operation means a time required from when a plant construction process starts until the process is finished. When there is only a few usable heavy machinery or operators, relative to the contents of the operation, the period required for the planned operation is prolonged. When much heavy machinery that can handle heavy objects can be prepared or there are many operators, the period required for the planned operation can be shortened. The shortened period required for the operation also shortens the period during which, for example, the foundation used to carry out the operation is employed. As a result, operation costs can be reduced.

A structure of an operation simulation system for plant construction of this embodiment that uses the period required for an operation as the index is equivalent to the operation simulation system for plant construction shown in FIG. 1. The index calculated in each calculation apparatus is related to the period required for an operation. The operation index calculation apparatus 103 calculates this period based on the crane type set by the heavy machinery setting apparatus 102. When, for example, the number of cranes is set to 2, either or both of the two cranes can be operated and thereby the period during which the operation is stopped can be reduced, reducing the period required for the operation. The foundation construction index calculation apparatus 105 calculates the period required for an operation based on the foundation placement set by the foundation placement setting apparatus 104. When, for example, the foundation area is set to a large value, a margin is provided in the operating range of the crane or the like and thereby the time spent performing preliminary operations such as K-turns needed between essential operations can be reduced, reducing the period required for the operation. The operation period index calculation apparatus 107 calculates the period required for an operation in an individual process based on the operation period set by the operation period setting apparatus 106. When, for example, the operation period is set to a small value, the period required for an operation in the individual process is split. When split periods are individually optimized, the period required for the entire operation is shortened. The temporary placement index calculation apparatus 109 calculates the period required for an operation based on the specifications for the installation object which is set in the installation object setting apparatus 108. When, for example, a plurality of equipments is temporarily placed, if these equipments are spaced, situations to avoid interference during installation can be reduced. Accordingly, the time spent performing preliminary operations to avoid the interference is reduced, reducing the period required for the operation. The installation operation index calculation apparatus 111 calculates the period required for an operation based on the installation milestone set by the installation milestone setting apparatus 110. When, for example, the installation milestone interval is reduced, the period required for an operation to complete one milestone can be shortened.

The flow of processing in which the period required for an operation is used as the index is equivalent to the flows shown in FIGS. 2 and 5. The set value compared, entered, or output in each step is related to the period. The user responsible for planning plant construction operations can use this flow for processing to generate a plan for optimizing the period required for an operation.

Figure 10:
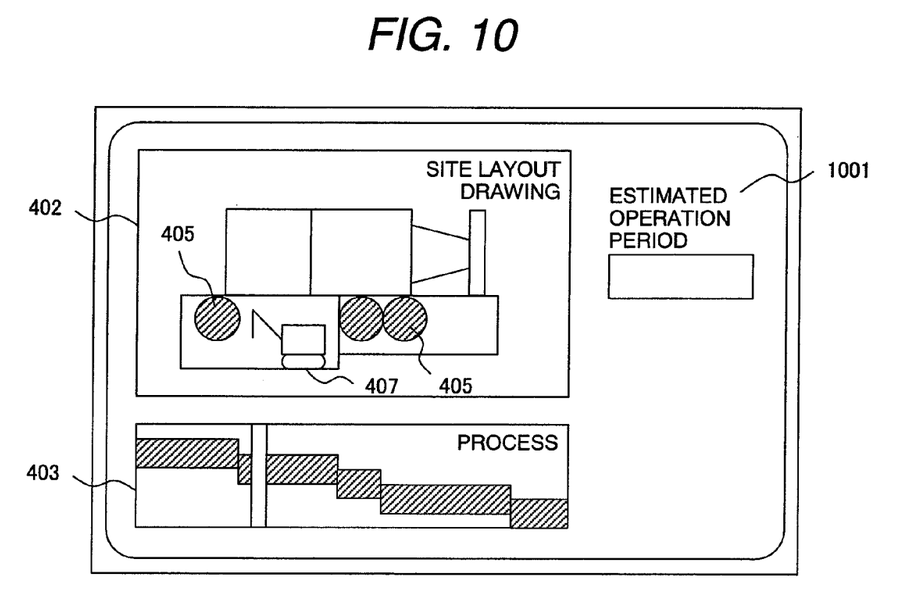
FIG. 10 is an explanatory drawing showing an example of an image displayed on a display apparatus of an output apparatus of an operation simulation system for plant construction according to a fifth embodiment which is another embodiment of the present invention when a period required for an operation is used as the index.

FIG. 10 shows an exemplary output, in this embodiment, which is displayed on the display apparatus of the output apparatus 114. In addition to the site layout drawing 402 and process chart 403 as shown in FIG. 4, an estimated operation period, which is output by the system, is displayed in a section 1001 for outputting the estimated operation period. The period, shown in the process chart 403, from the start to completion is equivalent to the estimated operation period.

In the operation simulation system for plant construction of the above embodiments of the present invention, the number of setting apparatus and index calculation apparatus and their types in the system can be increased or decreased. Specifically, to generate a plant construction plan based on an increased number of indexes, the number of setting apparatus and corresponding index calculation apparatus are increased; to generate a plant construction plan according to a decreased number of indexes, the number of setting apparatus and corresponding index calculation apparatus are decreased. The plant construction plan can then be generated according to only a necessary number of indexes, without using extra indexes.

INDUSTRIAL APPLICABILITY

The present invention relates to an operation simulation system for increasing the efficiency of plant construction planning. For example, the output apparatus of the operation simulation system for plant construction of the present invention can also be used to make a presentation on efficient plant construction planning to customers.

What is claimed is:

1. An operation simulation system for plant construction, comprising:
    an input apparatus for giving a command input;
    a heavy machinery setting apparatus for determining a type of a crane used in a construction operation based on the command input;
    an operation index calculation apparatus for calculating operating expenses in the operation based on the determined crane type;
    a foundation placement setting apparatus for determining placement of a foundation, which defines an operating range of the-determined crane;
    a foundation construction index calculation apparatus for calculating the expenses cost to construct a foundation based on the foundation placement;
    an operation period setting apparatus for determining a period during which an operation is carried out based on the command input;
    an operation period index calculation apparatus for calculating the operating expenses based on the determined period;
    an installation object setting apparatus for determining specifications of the installation object based on the command input;
    a temporary placement index calculation apparatus for calculating, based on the determined specifications of the installation object, the expenses cost to occupy an area in which to temporarily place the installation object before the installation object is installed;
    an installation milestone setting apparatus for determining a due date of the installation object based on the command input;
    an installation operation index calculation apparatus for calculating the installation operation expenses based on a received installation milestone;
    a total index calculation apparatus for calculating the total necessary expenses based on indexes calculated by the operation index calculation apparatus, foundation construction index calculation apparatus, operation period index calculation apparatus, a temporary placement index calculation apparatus and installation operation index calculation apparatus;
    an evaluation analysis apparatus for analyzing and evaluating calculated results; and
    an adjustment support apparatus for adjusting the command input based on evaluation information generated in the evaluation analysis apparatus so that the value of the command input falls in a range of set values in the specifications held by the corresponding setting apparatus.

2. An operation simulation system for plant construction, comprising:
    an input apparatus for giving a command input;
    a heavy machinery setting apparatus for determining a type of a crane used in a construction operation based on the command input;
    an operation index calculation apparatus for calculating a first operation leveling degree, which indicates a change in the amount of operation, based on the determined crane type;
    a foundation placement setting apparatus for determining placement of a foundation, which defines an operating range of the determined crane;
    a foundation construction index calculation apparatus for calculating a second operation leveling degree for a foundation construction operation based on the determined foundation placement;
    an operation period setting apparatus for determining a period during which an operation is carried out based on the command input;
    an operation period index calculation apparatus for calculating a third operation leveling degree during an operation period based on the determined operation period;

an installation object setting apparatus for determining specifications of the installation object based on the command input;

a temporary placement index calculation apparatus for calculating, based on the determined specifications of a installation object, a fourth operation leveling degree for an operation to temporarily place the installation object before the installation object is installed;

an installation milestone setting apparatus for determining a due date of the installation object based on the command input;

an installation operation index calculation apparatus for calculating a fifth operation leveling degree for an installation operation based on the determined installation milestone;

a total index calculation apparatus for calculating a total operation leveling degree based on indexes calculated by the operation index calculation apparatus, foundation construction index calculation apparatus, operation period index calculation apparatus, temporary placement index calculation apparatus and installation operation index calculation apparatus;

an evaluation analysis apparatus for analyzing and evaluating calculated results; and an adjustment support apparatus for adjusting the command input based on evaluation information generated in the evaluation analysis apparatus so that the value of the command input falls in a range of set values in the specifications held by the corresponding setting apparatus.

3. An operation simulation system for plant construction, comprising:

an input apparatus for giving a command input;

a heavy machinery setting apparatus for determining a type of a crane used in a construction operation based on the command input;

an operation index calculation apparatus for calculating a first foundation area, which is required for an operation, based on the determined crane type;

a foundation placement setting apparatus for determining placement of a foundation, which defines an operating range of the determined crane;

a foundation construction index calculation apparatus for calculating a second foundation area based on the determined foundation placement;

an operation period setting apparatus for determining a period during which an operation is carried out based on the command input;

an operation period index calculation apparatus for calculating, based on the determined operation period, a third foundation area required during the operation period;

an installation object setting apparatus for determining specifications of the installation object based on the command input;

a temporary placement index calculation apparatus for calculating, based on the determined specifications of a installation object to be installed, a fourth foundation area required by heavy machinery to temporarily place the installation object before the installation object is installed;

an installation milestone setting apparatus for determining a due date of the installation object based on the command input;

an installation operation index calculation apparatus for calculating a fifth foundation area required for an installation operation based on the determined installation milestone;

a total index calculation apparatus for calculating a total necessary foundation area based on indexes calculated by the operation index calculation apparatus, foundation construction index calculation apparatus, operation period index calculation apparatus, temporary placement index calculation apparatus and installation operation index calculation apparatus;

an evaluation analysis apparatus for analyzing and evaluating calculated results; and an adjustment support apparatus for adjusting the command input based on evaluation information generated in the evaluation analysis apparatus so that the value of the command input falls in a range of set values in the specifications held by the corresponding setting apparatus.

4. An operation simulation system for plant construction, comprising:

an input apparatus for giving a command input;

a heavy machinery setting apparatus for determining a type of a crane used in a construction operation based on the command input;

an operation index calculation apparatus for calculating, based on the determined crane type, the number of usable operation modes that are enabled in an operation;

a foundation placement setting apparatus for determining placement of a foundation, which defines an operating range of the determined crane;

a foundation construction index calculation apparatus for calculating the number of constructable foundation layouts based on the determined foundation placement;

an operation period setting apparatus for determining a period during which an operation is carried out based on the command input;

an operation period index calculation apparatus for calculating the number of applicable operation plans based on the determined operation period;

an installation object setting apparatus for determining specifications of the installation object based on the command input;

a temporary placement index calculation apparatus for calculating, based on the determined specifications of a device to be installed, the number of combinations of areas, in which to temporarily place the device before the device is installed;

an installation milestone setting apparatus for determining a due date of the installation object based on the command input;

an installation operation index calculation apparatus for calculating the number of applicable operation plans based on the determined installation milestone;

a total index calculation apparatus for calculating a total number of operation plans under conditions capable of being handled based on indexes calculated by the operation index calculation apparatus, foundation construction index calculation apparatus, operation period index calculation apparatus, temporary placement index calculation apparatus, and installation operation index calculation apparatus;

an evaluation analysis apparatus for analyzing and evaluating calculated results; and an adjustment support apparatus for adjusting the command input based on evaluation information generated in the evaluation analysis apparatus so that the value of the command input falls in a range of set values in the specifications held by the corresponding setting apparatus.

5. An operation simulation system for plant construction, comprising:
- an input apparatus for giving a command input;
- a heavy machinery setting apparatus for determining a type of a crane used in a construction operation based on the command input;
- an operation index calculation apparatus for calculating a first period required for an operation based on the determined crane type;
- a foundation placement setting apparatus for determining placement of a foundation, which defines an operating range of the determined crane;
- a foundation construction index calculation apparatus for calculating a second period required to construct a foundation based on the determined foundation placement;
- an operation period setting apparatus for determining a period during which an operation is carried out based on the command input;
- an operation period index calculation apparatus for individually calculating a third period required to execute an operation process based on the determined operation period;
- an installation object setting apparatus for determining specifications of the installation object based on the command input;
- a temporary placement index calculation apparatus for calculating, based on the determined specifications of a installation object to be installed, a fifth period required to execute an operation to temporarily place the installation object before the installation object is installed;
- an installation milestone setting apparatus for determining a due date of the installation object based on the command input;
- an installation operation index calculation apparatus for calculating an operation period required for the installation milestone based on the determined installation milestone;
- a total index calculation apparatus for calculating a total operation period based on indexes calculated by the operation index calculation apparatus, foundation construction index calculation apparatus, operation period index calculation apparatus, temporary placement index calculation apparatus, and installation operation index calculation apparatus;
- an evaluation analysis apparatus for analyzing and evaluating calculated results; and
- an adjustment support apparatus for adjusting the command input based on evaluation information generated in the evaluation analysis apparatus so that the value of the command input falls in a range of set values in the specifications held by the corresponding setting apparatus.

* * * * *